United States Patent
Yang et al.

(10) Patent No.: US 9,768,923 B2
(45) Date of Patent: Sep. 19, 2017

(54) METHOD AND APPARATUS FOR ACQUIRING UPLINK SYNCHRONIZATION IN WIRELESS COMMUNICATION SYSTEM

(71) Applicant: LG ELECTRONICS INC., Seoul (KR)

(72) Inventors: Suckchel Yang, Anyang-si (KR); Dongyoun Seo, Anyang-si (KR); Joonkui Ahn, Anyang-si (KR)

(73) Assignee: LG Electronics Inc., Seoul (KR)

(*) Notice: Subject to any disclaimer, the term of this patent is extended or adjusted under 35 U.S.C. 154(b) by 232 days.

(21) Appl. No.: 14/367,817

(22) PCT Filed: Dec. 20, 2012

(86) PCT No.: PCT/KR2012/011164
§ 371 (c)(1),
(2) Date: Jun. 20, 2014

(87) PCT Pub. No.: WO2013/095003
PCT Pub. Date: Jun. 27, 2013

(65) Prior Publication Data
US 2015/0333879 A1  Nov. 19, 2015

Related U.S. Application Data

(60) Provisional application No. 61/577,681, filed on Dec. 20, 2011.

(51) Int. Cl.
*H04L 5/00* (2006.01)
*H04W 74/08* (2009.01)
(Continued)

(52) U.S. Cl.
CPC ......... *H04L 5/001* (2013.01); *H04W 56/0005* (2013.01); *H04W 56/0045* (2013.01);
(Continued)

(58) Field of Classification Search
None
See application file for complete search history.

(56) References Cited

U.S. PATENT DOCUMENTS 9,642,161 B2 * 5/2017 Wu ..................... H04W 74/006
2012/0257569 A1 * 10/2012 Jang ........................ H04L 5/001
370/328

(Continued)

FOREIGN PATENT DOCUMENTS

CN 102118801 A 7/2011
EP 2693801 A1 2/2014
(Continued)

OTHER PUBLICATIONS

International Search Report from PCT/KR/2012/011164, dated Apr. 8, 2013.
(Continued)

*Primary Examiner* — Steve Young
(74) *Attorney, Agent, or Firm* — Dentons US LLP

(57) ABSTRACT

The present invention relates to a wireless communication system. More particularly, the present invention relates to a method for acquiring uplink synchronization in a terminal having a plurality of cells in a carrier aggregation-based wireless communication system and an apparatus therefor, the method comprising the steps of: transmitting a random access preamble on a first cell; receiving a random access response message including an uplink timing adjustment value for the first cell after transmitting the random access preamble; and performing uplink transmission in the first cell by using the uplink timing adjustment value, wherein a transmission time point of the random access preamble is given based on a specific time point related to a second cell.

18 Claims, 11 Drawing Sheets

(51) Int. Cl.
*H04W 56/00* (2009.01)
*H04W 88/02* (2009.01)
(52) U.S. Cl.
CPC .... *H04W 74/0833* (2013.01); *H04W 56/0075* (2013.01); *H04W 88/02* (2013.01)

(56) References Cited

U.S. PATENT DOCUMENTS

| | | | |
|---|---|---|---|
| 2013/0083704 A1* | 4/2013 | Gaal | H04L 5/001 370/277 |
| 2013/0250911 A1* | 9/2013 | Kwon | H04W 56/00 370/331 |
| 2014/0233542 A1* | 8/2014 | Bergstrom | H04L 5/0085 370/336 |
| 2014/0369322 A1* | 12/2014 | Fwu | H04W 52/18 370/336 |

FOREIGN PATENT DOCUMENTS

| | | |
|---|---|---|
| KR | 10-2009-0115913 A | 11/2009 |
| KR | 10-2010-0073105 A | 7/2010 |
| KR | 10-2011-0108536 A | 10/2010 |
| KR | 10-2011-0093632 A2 | 8/2011 |
| WO | 2011090301 A2 | 7/2011 |
| WO | 2011-116242 A1 | 9/2011 |

OTHER PUBLICATIONS

Written Opinion of the ISA from PCT/KR/2012/011164, dated Apr. 8, 2013.

* cited by examiner

Hatched region is generated as RACC-UL transmission
timing is determined based on RefCC DL reception timing

* Reception and/or use are limited in overlapped DL region

METHOD AND APPARATUS FOR ACQUIRING UPLINK SYNCHRONIZATION IN WIRELESS COMMUNICATION SYSTEM

This application is a 35 USC §371 National Stage entry of International Application No. PCT/KR2012/011164, filed Dec. 20, 2012, and claims priority to U.S. Provisional Application No. 61/577,681 filed Dec. 20, 2011, each of which are hereby incorporated by reference in its entirety.

TECHNICAL FIELD

The present invention relates to a wireless communication system and, more particularly, to a method for acquiring uplink synchronization in a carrier aggregation (CA)-based wireless communication system and an apparatus therefor. More specifically, the invention relates to a method and apparatus for performing a random access procedure for acquiring uplink synchronization.

BACKGROUND ART

Wireless communication systems have been widely deployed to provide various types of communication services including voice and data services. In general, a wireless communication system is a multiple access system that supports communication among multiple users by sharing available system resources (e.g. bandwidth, transmit power, etc.) among the multiple users. The multiple access system may adopt a multiple access scheme such as Code Division Multiple Access (CDMA), Frequency Division Multiple Access (FDMA), Time Division Multiple Access (TDMA), Orthogonal Frequency Division Multiple Access (OFDMA), or Single Carrier Frequency Division Multiple Access (SC-FDMA).

DISCLOSURE

Technical Problem

An object of the present invention devised to solve the problem lies in a method for efficiently acquiring uplink synchronization in a CA-based wireless communication system and an apparatus therefor. Another object of the present invention is to provide a method and apparatus for efficiently performing a random access procedure for acquiring uplink synchronization.

The technical problems solved by the present invention are not limited to the above technical problems and those skilled in the art may understand other technical problems from the following description.

Technical Solution

The object of the present invention can be achieved by providing a method for acquiring uplink synchronization in user equipment (UE) for which a plurality of cells is configured in a carrier aggregation-based wireless communication system, the method including: transmitting a random access preamble on a first cell; receiving a random access response message including an uplink timing adjustment value for the first cell after transmitting the random access preamble; and performing uplink transmission in the first cell using the uplink timing adjustment value, wherein transmission timing of the random access preamble is determined based on specific timing related to a second cell.

In another aspect of the present invention, provided herein is a UE for use in a carrier aggregation-based wireless communication system, including: a radio frequency (RF) unit; and a processor, wherein the processor is configured to transmit a random access preamble on a first cell, to receive a random access response message including an uplink timing adjustment value for the first cell after transmitting the random access preamble and to perform uplink transmission in the first cell by using the uplink timing adjustment value, wherein transmission timing of the random access preamble is determined based on specific timing related to a second cell.

The first cell may belong to a first timing advance (TA) group, the second cell may belong to a second TA group, and the first TA group may differ from the second TA group.

The first cell may be a secondary cell (SCell) and the second cell may be a primary cell (PCell).

Transmission start timing of the random access preamble may be determined based on transmission start timing of an uplink subframe in the second cell.

Transmission start timing of the random access preamble may be determined based on reception start timing of a downlink subframe in the second cell.

Transmission start timing of the random access preamble may be determined based on reception end timing of a downlink subframe in the second cell.

The first cell and the second cell may be identical to each other when the first cell is a PCell and the first cell may differ from the second cell when the first cell is an SCell.

Advantageous Effects

According to the present invention, it is possible to efficiently acquire uplink synchronization in a CA-based wireless communication system. In addition, it is possible to efficiently perform a random access procedure for acquiring uplink synchronization.

The effects of the present invention are not limited to the above-described effects and other effects which are not described herein will become apparent to those skilled in the art from the following description.

DESCRIPTION OF DRAWINGS

The accompanying drawings, which are included to provide a further understanding of the invention, illustrate embodiments of the invention and together with the description serve to explain the principle of the invention. In the drawings.

BEST MODE

Embodiments of the present invention are applicable to a variety of wireless access technologies such as Code Division Multiple Access (CDMA), Frequency Division Multiple Access (FDMA), Time Division Multiple Access (TDMA), Orthogonal Frequency Division Multiple Access (OFDMA), and Single Carrier Frequency Division Multiple Access (SC-FDMA). CDMA can be implemented as a radio technology such as Universal Terrestrial Radio Access (UTRA) or CDMA2000. TDMA can be implemented as a radio technology such as Global System for Mobile communications (GSM)/General Packet Radio Service (GPRS)/Enhanced Data Rates for GSM Evolution (EDGE). OFDMA can be implemented as a radio technology such as Institute of Electrical and Electronics Engineers (IEEE) 802.11 (Wireless Fidelity (Wi-Fi)), IEEE 802.16 (Worldwide interoperability for Microwave Access (WiMAX)), IEEE 802.20, Evolved UTRA (E-UTRA). UTRA is a part of Universal Mobile Telecommunications System (UMTS). $3^{rd}$ Generation Partnership Project (3GPP) Long Term Evolution (LTE) is a part of Evolved UMTS (E-UMTS) using E-UTRA, employing OFDMA for downlink and SC-FDMA for uplink. LTE-Advanced (LTE-A) is an evolution of 3GPP LTE. While the following description is given, centering on 3GPP LTE/LTE-A to clarify the description, this is purely exemplary and thus should not be construed as limiting the present invention.

In a wireless communication system, a UE receives information from a BS on downlink (DL) and transmits information to the BS on uplink (UL). Information transmitted/received between the UE and BS includes data and various types of control information, and various physical channels are present according to type/purpose of information transmitted/received between the UE and BS.

Figure 1:
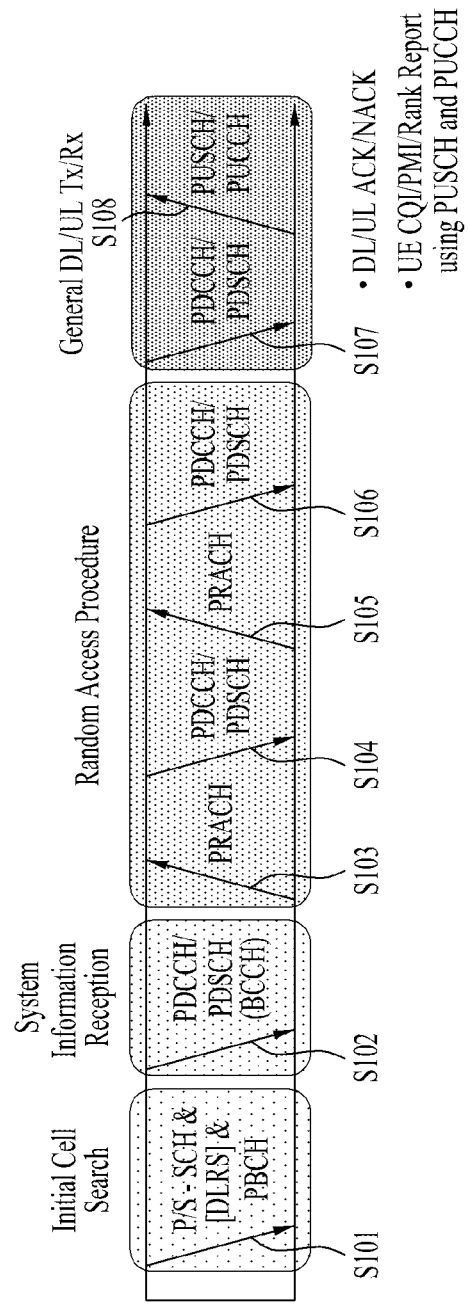
FIG. 1 illustrates physical channels used in a 3GPP LTE system and a conventional signal transmission method using the same.

FIG. 1 illustrates physical channels used in a 3GPP LTE system and a signal transmission method using the same.

When powered on or when a UE initially enters a cell, the UE performs initial cell search involving synchronization with a BS in step S101. For initial cell search, the UE synchronizes with the BS and acquire information such as a cell Identifier (ID) by receiving a primary synchronization channel (P-SCH) and a secondary synchronization channel (S-SCH) from the BS. Then the UE may receive broadcast information from the cell on a physical broadcast channel (PBCH). In the mean time, the UE may check a downlink channel status by receiving a downlink reference signal (DL RS) during initial cell search.

After initial cell search, the UE may acquire more specific system information by receiving a physical downlink control channel (PDCCH) and receiving a physical downlink shared channel (PDSCH) based on information of the PDCCH in step S102.

The UE may perform a random access procedure to access the BS in steps S103 to S106. For random access, the UE may transmit a preamble to the BS on a physical random access channel (PRACH) (S103) and receive a response message for preamble on a PDCCH and a PDSCH corresponding to the PDCCH (S104). In the case of contention-based random access, the UE may perform a contention resolution procedure by further transmitting the PRACH (S105) and receiving a PDCCH and a PDSCH corresponding to the PDCCH (S106).

After the foregoing procedure, the UE may receive a PDCCH/PDSCH (S107) and transmit a physical uplink shared channel (PUSCH)/physical uplink control channel (PUCCH) (S108), as a general downlink/uplink signal transmission procedure. Here, control information transmitted from the UE to the BS is called uplink control information (UCI). The UCI may include a hybrid automatic repeat and request (HARQ) acknowledgement (ACK)/negative-ACK (HARQ ACK/NACK) signal, a scheduling request (SR), channel state information (CSI), etc. The CSI includes a channel quality indicator (CQI), a precoding matrix index (PMI), a rank indicator (RI), etc. While the UCI is transmitted through a PUCCH in general, it may be transmitted through a PUSCH when control information and traffic data need to be simultaneously transmitted. The UCI may be aperiodically transmitted through a PUSCH at the request/instruction of a network.

Figure 2:
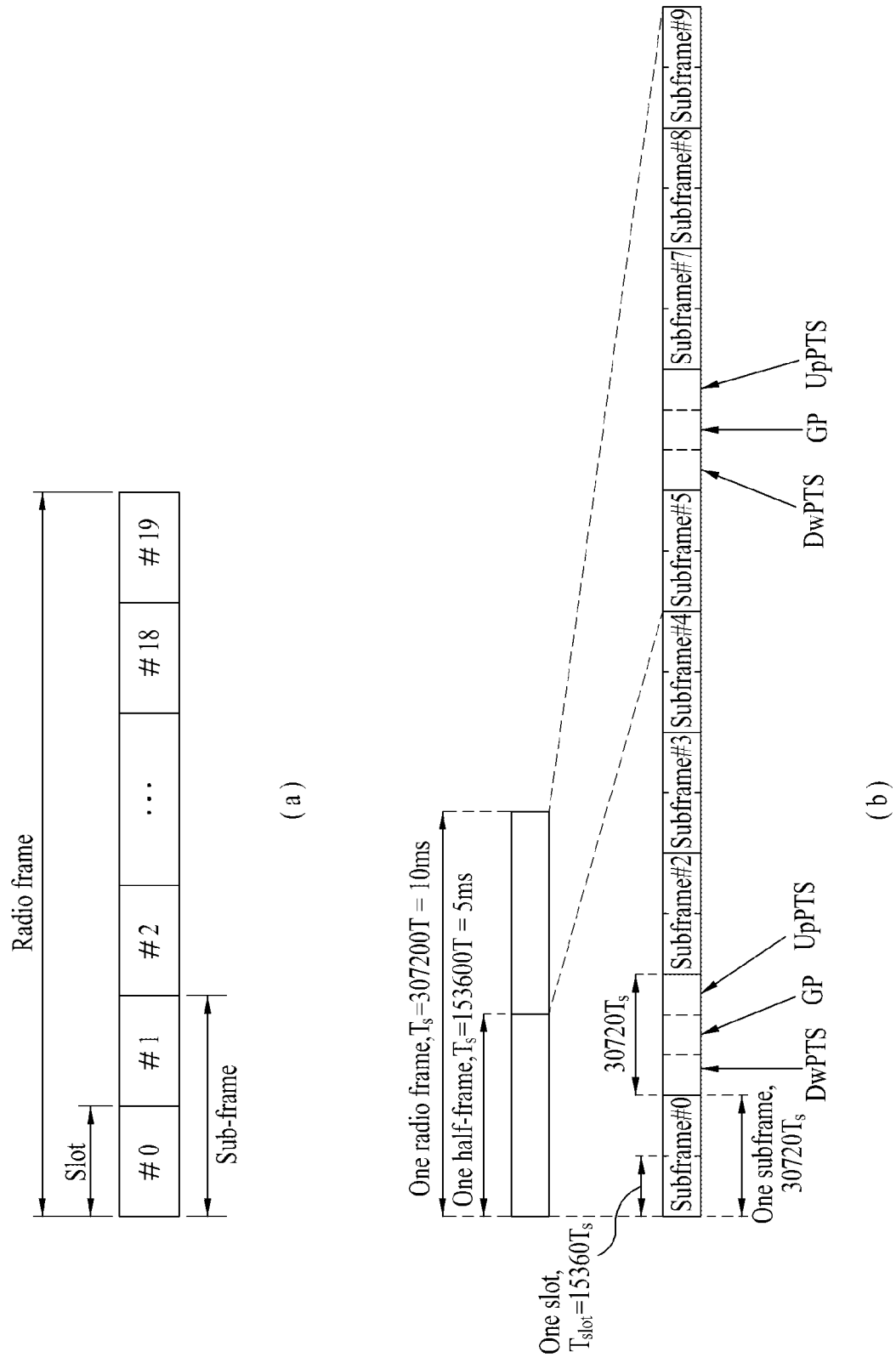
FIG. 2 illustrates a radio frame structure.

FIG. 2 illustrates a radio frame structure. Uplink/downlink data packet transmission is performed on a subframe-by-subframe basis. A subframe is defined as a predetermined time interval including a plurality of OFDM symbols. LTE (-A) supports a type-1 radio frame structure for FDD (frequency division duplex) and a type-2 radio frame structure for TDD (time division duplex).

FIG. 2(*a*) illustrates a type-1 radio frame structure. A downlink subframe includes 10 subframes each of which includes 2 slots in the time domain. A time for transmitting a subframe is defined as a transmission time interval (TTI). For example, each subframe has a length of 1 ms and each slot has a length of 0.5 ms. A slot includes a plurality of OFDM symbols in the time domain and includes a plurality of resource blocks (RBs) in the frequency domain. Since downlink uses OFDM in LTE(-A), an OFDM symbol represents a symbol period. The OFDM symbol may be called an SC-FDMA symbol or symbol period. An RB as a resource allocation unit may include a plurality of consecutive subcarriers in one slot.

The number of OFDM symbols included in one slot may depend on Cyclic Prefix (CP) configuration. When an OFDM symbol is configured with the normal CP, for example, the number of OFDM symbols included in one slot may be 7. When an OFDM symbol is configured with the extended CP, the number of OFDM symbols included in one slot may be 6. When a channel state is unstable, such as a case in which a UE moves at a high speed, the extended CP can be used to reduce inter-symbol interference.

When the normal CP is used, one subframe includes 14 OFDM symbols since one slot has 7 OFDM symbols. The first three OFDM symbols at most in each subframe can be allocated to a PDCCH and the remaining OFDM symbols can be allocated to a PDSCH.

FIG. 2(*b*) illustrates a type-2 radio frame structure. The type-2 radio frame includes 2 half frames. Each half frame includes 4(5) normal subframes and one (zero) special subframe. The normal subframes are used for uplink and downlink according to UL-DL configuration. A subframe is composed of two slots.

Table 1 shows subframe configurations in a radio frame according to UL-DL configuration.

TABLE 1

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table 1, D denotes a downlink subframe, U denotes an uplink subframe and S denotes a special subframe. The special subframe includes DwPTS (Downlink Pilot TimeSlot), GP (Guard Period) and UpPTS (Uplink Pilot TimeSlot). DwPTS is used for initial cell search, synchronization or channel estimation in a UE. UpPTS is used for channel estimation in an eNB and uplink transmission synchronization in the UE. The GP is used to eliminate interference generated on uplink due to downlink signal multipath delay between uplink and downlink.

The radio frame structure is exemplary and the number of subframes in the radio frame, the number of slots and the number of symbols may be changed.

Figure 3:
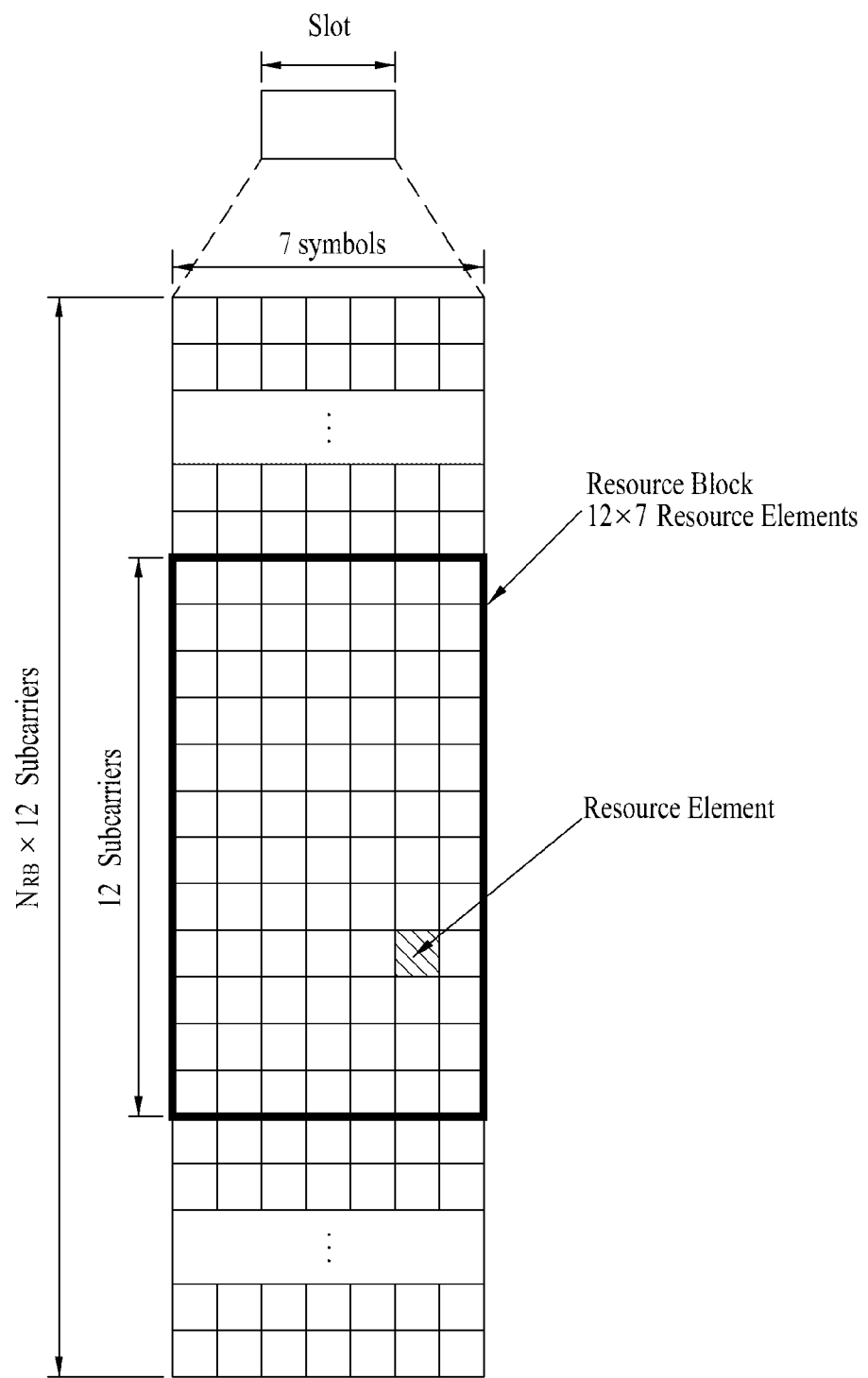
FIG. 3 illustrates a resource grid of a downlink slot.

FIG. 3 illustrates a resource grid of a downlink slot.

Referring to FIG. 3, a downlink slot includes a plurality of OFDM symbols in the time domain. One downlink slot may include 7 OFDM symbols, and one resource block (RB) may include 12 subcarriers in the frequency domain in FIG. 3. However, the present invention is not limited thereto. Each element on the resource grid is referred to as a resource element (RE). One RB includes 12×7 REs. The number $N_{DL}$ of RBs included in the downlink slot depends on a downlink transmit bandwidth. The structure of an uplink slot may be same as that of the downlink slot.

Figure 4:
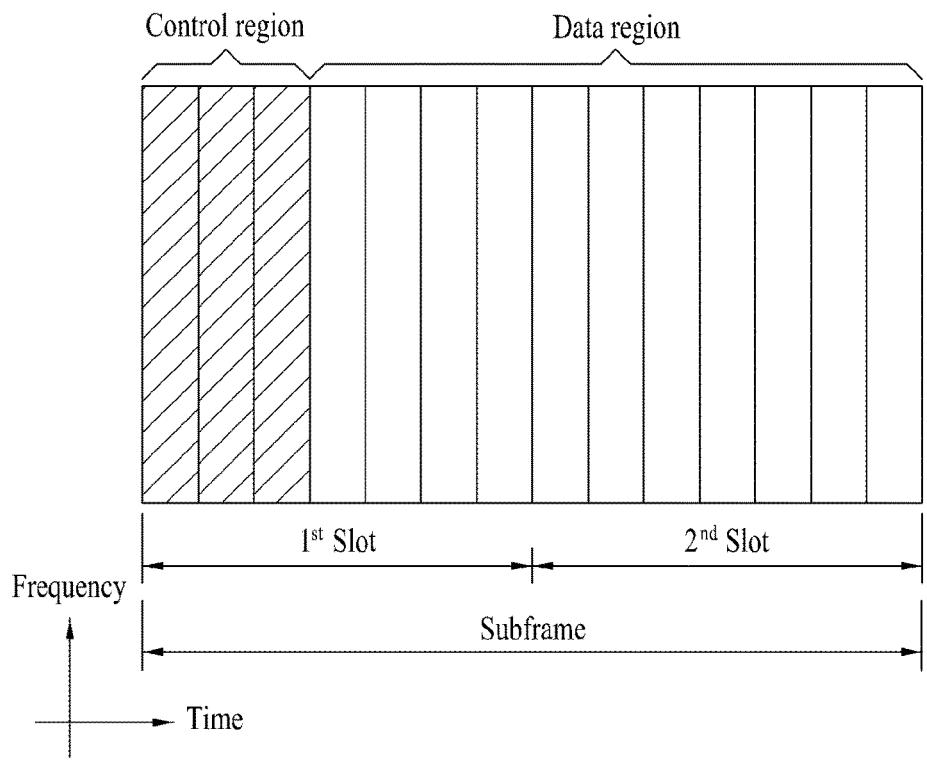
FIG. 4 illustrates a downlink subframe structure.

FIG. 4 illustrates a downlink subframe structure.

Referring to FIG. 4, a maximum of three (four) OFDM symbols located in a front portion of a first slot within a subframe correspond to a control region to which a control channel is allocated. The remaining OFDM symbols correspond to a data region to which a physical downlink shared chancel (PDSCH) is allocated. A basic resource unit of the data region is an RB. Examples of downlink control channels used in LTE include a physical control format indicator channel (PCFICH), a physical downlink control channel (PDCCH), a physical hybrid ARQ indicator channel (PHICH), etc. The PCFICH is transmitted at a first OFDM symbol of a subframe and carries information regarding the number of OFDM symbols used for transmission of control channels within the subframe. The PHICH is a response of uplink transmission and carries an HARQ acknowledgment (ACK)/not-acknowledgment (NACK) signal. Control information transmitted through the PDCCH is referred to as downlink control information (DCI). The DCI includes uplink or downlink scheduling information or uplink transmit power control commands for an arbitrary UE group.

Control information transmitted through a PDCCH is referred to as DCI (Downlink Control Information). Formats 0, 3, 3A and 4 for uplink and formats 1, 1A, 1B, 1C, 1D, 2, 2A, 2B and 2C for downlink are defined as DCI formats. Information field type, the number of information fields and the number of bits of each information bit depend on DCI format. For example, the DCI formats selectively include information such as hopping flag, RB allocation, MCS (Modulation Coding Scheme), RV (Redundancy Version), NDI (New Data Indicator), TPC (Transmit Power Control), HARQ process number, PMI (Precoding Matrix Indicator) confirmation according as necessary. Accordingly, the size of control information mapped to a DCI format depends on the DCI format. An arbitrary DCI format may be used to transmit two or more types of control information. For example, DCI formats 0/1A are used to carry DCI format 0 or DCI format 1 and are discriminated from each other by a flag field.

A PDCCH may carry a transport format and a resource allocation of a downlink shared channel (DL-SCH), resource allocation information of an uplink shared channel (UL-SCH), paging information on a paging channel (PCH), system information on the DL-SCH, information on resource allocation of an upper-layer control message such as a random access response transmitted on the PDSCH, a set of Tx power control commands on individual UEs within an arbitrary UE group, a Tx power control command, information on activation of a voice over IP (VoIP), etc. A plurality of PDCCHs can be transmitted within a control region. The UE can monitor the plurality of PDCCHs. The PDCCH is transmitted on an aggregation of one or several consecutive control channel elements (CCEs). The CCE is a logical allocation unit used to provide the PDCCH with a coding rate based on a state of a radio channel. The CCE corresponds to a plurality of resource element groups (REGs). A format of the PDCCH and the number of bits of the available PDCCH are determined by the number of CCEs. The BS determines a PDCCH format according to DCI to be transmitted to the UE, and attaches a cyclic redundancy check (CRC) to control information. The CRC is masked with a unique identifier (referred to as a radio network temporary identifier (RNTI)) according to an owner or usage of the PDCCH. If the PDCCH is for a specific UE, a unique identifier (e.g., cell-RNTI (C-RNTI)) of the UE may be masked to the CRC. Alternatively, if the PDCCH is for a paging message, a paging identifier (e.g., paging-RNTI (P-RNTI)) may be masked to the CRC. If the PDCCH is for system information (more specifically, a system information block (SIB)), a system information RNTI (SI-RNTI) may be masked to the CRC. When the PDCCH is for a random access response, a random access-RNTI (RA-RNTI) may be masked to the CRC.

A PDCCH carries a message known as DCI and the DCI includes information about resource assignment for one UE or UE group and control information. In general, a plurality of PDCCHs can be transmitted in a single subframe. Each PDCCH is transmitted using one or more control channel elements (CCEs) and each CCE corresponds to 9 sets of resource element groups (REGs). An REG corresponds to 4 REs. 4 QPSK symbols are mapped to one REG. REs allocated to a reference signal are not included in an REG, and thus the number of REGs within a given OFDM symbol varies according to whether a cell-specific reference signal is present. The concept of REG (i.e. group based mapping, each group including 4 REs) is used for other downlink control channels (PCFICH and PHICH). That is, an REG is used as a basic resource unit of a control region. 4 PDCCH formats are supported as shown in Table 2.

TABLE 2

| PDCCH format | Number of CCEs (n) | Number of REGs | Number of PDCCH bits |
|---|---|---|---|
| 0 | 1 | 9 | 72 |
| 1 | 2 | 18 | 144 |
| 2 | 4 | 36 | 288 |
| 3 | 8 | 72 | 576 |

CCEs are sequentially numbered. To simplify a decoding process, transmission of a PDCCH having a format including n CCEs can be started using as many CCEs as a multiple of n. The number of CCEs used to transmit a specific PDCCH is determined by a BS according to channel condition. For example, if a PDCCH is for a UE having a high-quality downlink channel (e.g. a channel close to the BS), only one CCE can be used for PDCCH transmission. However, for a UE having a poor channel (e.g. a channel close to a cell edge), 8 CCEs can be used for PDCCH transmission in order to obtain sufficient robustness. In addition, a power level of the PDCCH can be controlled according to channel condition.

LTE defines CCE positions in a limited set in which PDCCHs can be positioned for each UE. CCE positions in a limited set that the UE needs to monitor in order to detect the PDCCH allocated thereto may be referred to as 'search space (SS)'. In LTE, an SS has a size depending on PDCCH format. A UE-specific search space (USS) and a common search space (CSS) are defined. The USS is set per UE and the CSS is equally set for UEs. The USS and the CSS may overlap for a predetermined UE. In the case of considerably small SS, when some CCE positions are allocated in an SS for a specific UE, there is no remaining CCE. Accordingly, a BS may not find CCE resources to be used to transmit PDCCHs to all available UEs in a predetermined subframe. To minimize the possibility that the above-described blocking continues in the next frame, a UE-specific hopping sequence is applied to the starting point of the USS.

Table 3 shows sizes of the USS and CSS.

TABLE 3

| PDCCH format | Number of CCEs (n) | Number of candidates in CSS | Number of candidates in USS |
|---|---|---|---|
| 0 | 1 | — | 6 |
| 1 | 2 | — | 6 |
| 2 | 4 | 4 | 2 |
| 3 | 8 | 2 | 2 |

To control computational load of blind decoding based on the number of blind decoding processes to an appropriate level, the UE is not required to simultaneously search for all defined DCI formats. In general, the UE searches for formats 0 and 1A at all times in the USS. Formats 0 and 1A have the same size and are discriminated from each other by a flag in a message. The UE may need to receive an additional format (e.g. format 1, 1B or 2 according to PDSCH transmission mode set by a BS). The UE searches for formats 1A and 1C in the CSS. Furthermore, the UE may be set to search for format 3 or 3A. Formats 3 and 3A have the same size as that of formats 0 and 1A and may be discriminated from each other by scrambling CRC with different (common) identifiers rather than a UE-specific identifier. Transmission modes for MIMO and information content of DCI formats are arranged below.

Transmission Mode (TM)
Transmission mode 1: Transmission from a single base station antenna port
Transmission mode 2: Transmit diversity
Transmission mode 3: Open-loop spatial multiplexing
Transmission mode 4: Closed-loop spatial multiplexing
Transmission mode 5: Multi-user MIMO
Transmission mode 6: Closed-loop rank-1 precoding
Transmission mode 7: Single-antenna port (port 5) transmission
Transmission mode 8: Double layer transmission (ports 7 and 8) or single-antenna port (port 7 or 8) transmission
Transmission mode 9: Transmission through a maximum of 8 layers (ports 7 to 14) or single-antenna port (port 7 or 8) transmission DCI Format
Format 0: Resource grants for PUSCH transmission (uplink)
Format 1: Resource assignments for single codeword PDSCH transmission (transmission modes 1, 2 and 7)
Format 1A: Compact signaling of resource assignments for single codeword PDSCH (all modes)
Format 1B: Compact resource assignments for PDSCH (mode 6) using rank-1 closed loop precoding
Format 1C: Very compact resource assignments for PDSCH (e.g. paging/broadcast system information)
Format 1D: Compact resource assignments for PDSCH (mode 5) using multi-user MIMO
Format 2: Resource assignments for PDSCH (mode 4) for closed-loop MIMO operation
Format 2A: Resource assignments for PDSCH (mode 3) for open-loop MIMO operation
Format 3/3A: Power control commands for PUCCH and PUSCH with 2-bit/1-bit power adjustment values FIG. 5 illustrates an uplink subframe structure.

Figure 5:
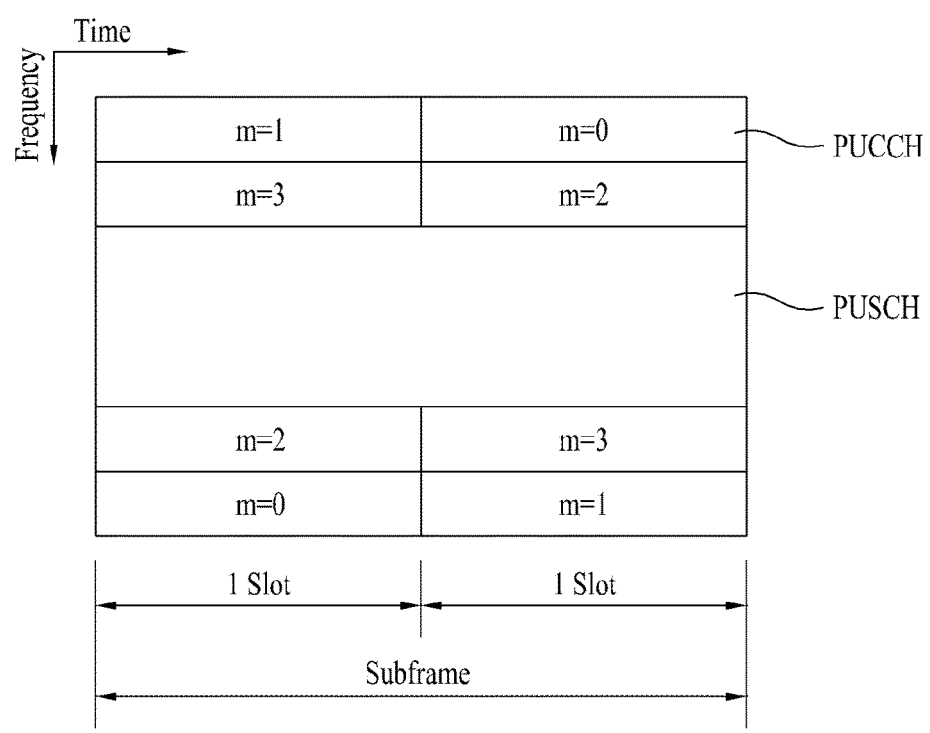
FIG. 5 illustrates an uplink subframe structure.

Referring to FIG. 5, an uplink subframe includes a plurality of (e.g. 2) slots. A slot may include different numbers of SC-FDMA symbols according to CP lengths. For example, a slot includes 7 SC-FDMA symbols in case of normal CP. The uplink subframe is divided into a control region and a data region in the frequency domain. The data region is allocated a PUSCH and used to carry a data signal such as audio data. The control region is allocated a PUCCH and used to carry control information. The PUCCH includes an RB pair (e.g. m=0, 1, 2, 3) located at both ends of the data region in the frequency domain and hopped in a slot boundary. Control information includes HARQ ACK/NACK, CQI (channel quality information), PMI (precoding matrix indicator), RI (rank indicator), etc.

A description will be given of a random access procedure. The random access procedure is also called RACH (random access channel) procedure. The random access procedure is used for initial access, uplink synchronization adjustment, resource assignment, handover, etc. The random access procedure is classified into a contention-based process and a dedicated (i.e. non-contention-based) process. The contention-based random access procedure includes initial access and is normally used, whereas the dedicated random access procedure is limitedly used for handover. In the contention-based random access procedure, a UE randomly select a RACH preamble sequence. Accordingly, a plurality of UEs can simultaneously transmit the same RACH preamble sequence and thus a contention resolution procedure is not needed. In the dedicated random access procedure, a UE uses a RACH preamble sequence uniquely allocated thereto by an eNB. Accordingly, the UE can perform the random access procedure without colliding with other UEs.

Figure 6A:
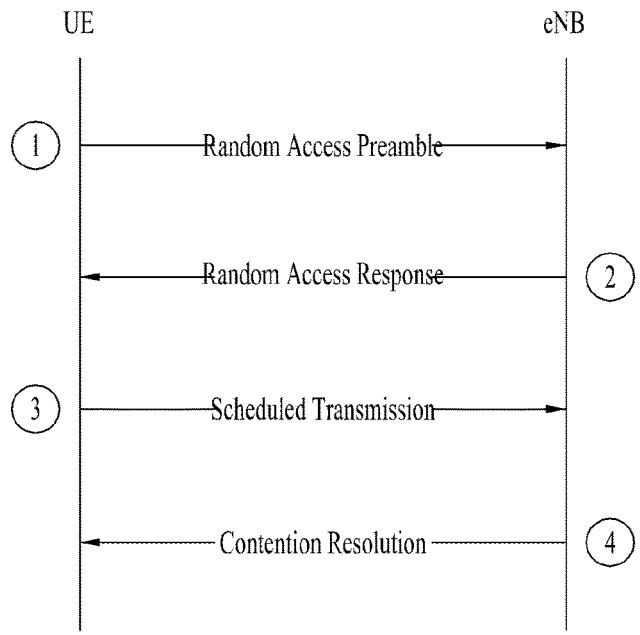
FIGS. 6*a* and 6*b* illustrate random access procedures.
Figure 6B:
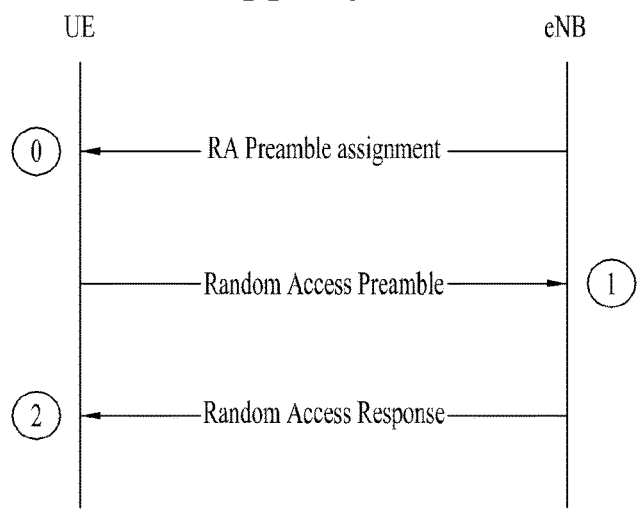

FIGS. 6a and 6b illustrate random access procedures. FIG. 6a shows a contention-based random access procedure and FIG. 6b shows a dedicated random access procedure.

Referring to FIG. 6a, the contention-based random access procedure has the following four steps. Messages transmitted in steps 1 to 4 may be respectively referred to as Msgs 1 to 4.

Step 1: RACH preamble (via PRACH) (UE=>BS)
Step 2: Random access response (RAR) (via PDCCH and PDSCH) (BS=>UE)
Step 3: Layer 2/Layer 3 message (via PUSCH) (UE=>BS)
Step 4: Contention resolution message (BS=>UE)

Referring to FIG. 6b, the dedicated random access procedure includes the following three steps. Messages transmitted in steps 0 to 2 may be respectively referred to as Msgs 0 to 2. Uplink transmission (i.e. step 3) corresponding to a RAR may be performed as part of the random access procedure, which is not shown. The dedicated random access procedure can be triggered using a PDCCH (referred to as PDCCH order hereinafter) used for a BS to order RACH preamble transmission.

Step 0: PACH preamble allocation through dedicated signaling (BS=>UE)
Step 1: RACH preamble (via PRACH) (UE=>BS)
Step 2: RAR (via PDCCH and PDSCH) (BS=>UE)

After transmission of RACH preamble, the UE attempts to receive an RAR within a predetermined time window. Specifically, the UE attempts to detect a PDCCH (referred to as RA-RNTI PDCCH hereinafter) having an RA-RNTI (Random Access RNTI) (e.g. a CRC is masked with RA-RNTI in the PDCCH) within the time window. The UE checks whether a RAR therefor is present in a PDSCH corresponding to the RA-RNTI PDCCH during RA-RNTI PDCCH detection. The RAR includes timing advance (TA) information indicating timing offset information for UL synchronization, UL resource allocation information (UL grant information), a temporary UE identifier (e.g. temporary cell-RNTI, TC-RNTI), etc. The UE can perform UL transmission according to resource allocation information and TA value in the RAR. HARQ is applied to UL transmission corresponding to the RAR. Accordingly, the UE can receive acknowledgement information (e.g. PHICH) corresponding to Msg 3 after transmission of Msg 3.

Figure 7:
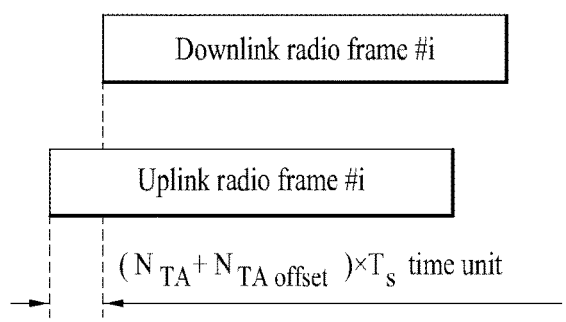
FIG. 7 illustrates uplink-downlink frame timing.

FIG. 7 illustrates an uplink-downlink frame timing relationship.

Referring to FIG. 7, transmission of uplink radio frame i is started $(N_{TA}+N_{TAoffset})*Ts$ seconds prior to transmission of a downlink radio frame corresponding thereto. In LTE, $0 \leq N_{TA} \leq 20512$, $N_{TAoffset}=0$ in FDD and $N_{TAoffset}=624$ in TDD. $N_{TAoffset}$ is a value pre-recognized by the BS and the UE. When $N_{TA}$ is indicated through a timing advance command during a random access procedure, the UE adjusts UL signal (e.g. PUCCH/PUSCH/SRS) transmission timing through the above expression. UL transmission timing is set to a multiple of 16 Ts. Ts denotes sampling time and may be 1/30720 ms, for example (refer to FIG. 2). The timing advance command orders a UL timing change on the basis of the current UL timing. A timing advance command (TA) in an RAR is 11 bits. TA indicates 0, 1, 2, . . . , 1282 and a timing adjustment value $N_{TA}$ is given as $N_{TA}=TA*16$. In other cases, TA is 6 bits and indicates 0, 1, 2, . . . , 63 and $N_{TA}$ is given as $N_{TA,new}=N_{TA,old}+(TA-31)*16$. TA received in a subframe n is applied from a subframe n+6. In the case of FDD, transmission timing of a UL subframe n is advanced from the start point of a DL subframe n, as shown in FIG. 7. In the case of TDD, the transmission timing of the UL subframe n is advanced from the end point of a DL subframe n+1 (not shown).

Figure 8:
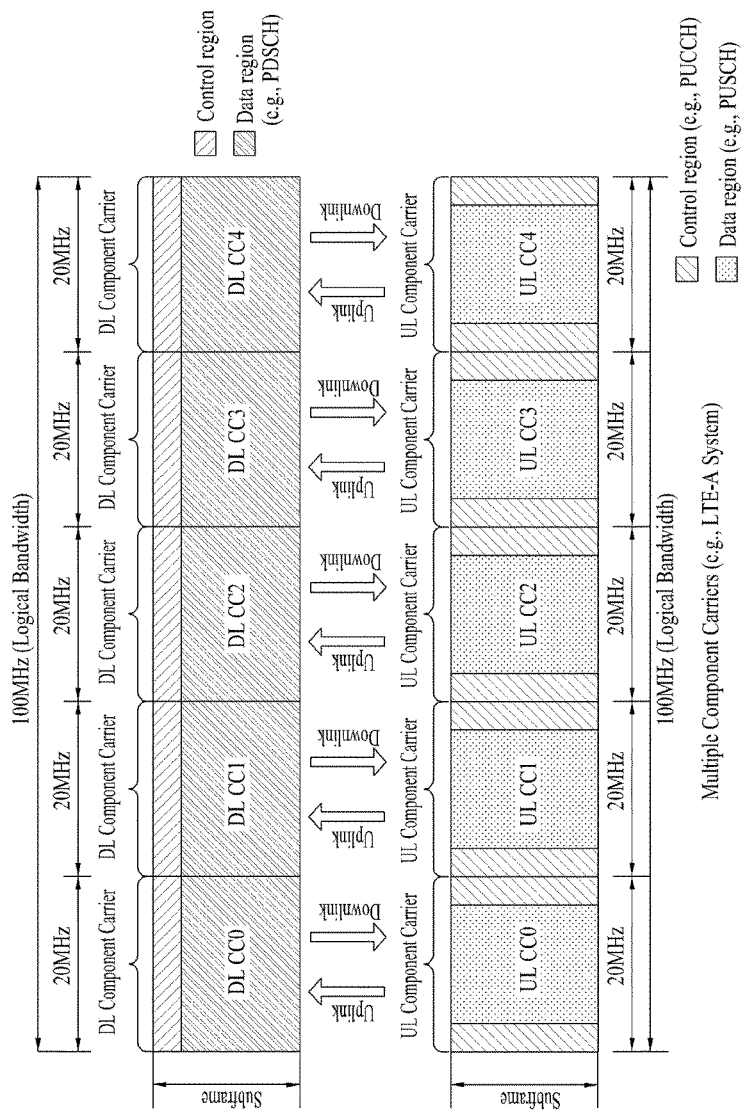
FIG. 8 illustrates a carrier aggregation (CA) communication system.

FIG. 8 illustrates a carrier aggregation (CA) communication system.

Referring to FIG. 8, a plurality of UL/DL component carriers (CCs) can be aggregated to support a wider UL/DL bandwidth. The CCs may be contiguous or non-contiguous in the frequency domain. Bandwidths of the CCs can be independently determined. Asymmetrical CA in which the number of UL CCs is different from the number of DL CCs can be implemented. Control information may be transmitted/received only through a specific CC. This specific CC may be referred to as a primary CC and other CCs may be referred to as secondary CCs. For example, when cross-carrier scheduling (or cross-CC scheduling) is applied, a PDCCH for downlink allocation can be transmitted on DL CC #0 and a PDSCH corresponding thereto can be transmitted on DL CC #2. The term "component carrier" may be replaced by other equivalent terms (e.g. "carrier", "cell", etc.).

For cross-CC scheduling, a carrier indicator field (CIF) is used. Presence or absence of the CIF in a PDCCH can be determined by higher layer signaling (e.g. RRC signaling) semi-statically and UE-specifically (or UE group-specifically). The baseline of PDCCH transmission is summarized as follows.

CIF disabled: a PDCCH on a DL CC is used to allocate a PDSCH resource on the same DL CC or a PUSCH resource on a linked UL CC.

No CIF

CIF enabled: a PDCCH on a DL CC can be used to allocate a PDSCH or PUSCH resource on a specific DL/UL CC from among a plurality of aggregated DL/UL CCs using the CIF.

LTE DCI format extended to have CIF

CIF corresponds to a fixed x-bit field (e.g. x=3) (when CIF is set)

CIF position is fixed irrespective of DIC format size (when CIF is set)

When the CIF is present, the BS may allocate a monitoring DL CC (set) to reduce BD complexity of the UE. For PDSCH/PUSCH scheduling, the UE may detect/decode a PDCCH only on the corresponding DL CCs. The BS may transmit the PDCCH only through the monitoring DL CC (set). The monitoring DL CC set may be set UE-specifically, UE-group-specifically or cell-specifically.

Figure 9:
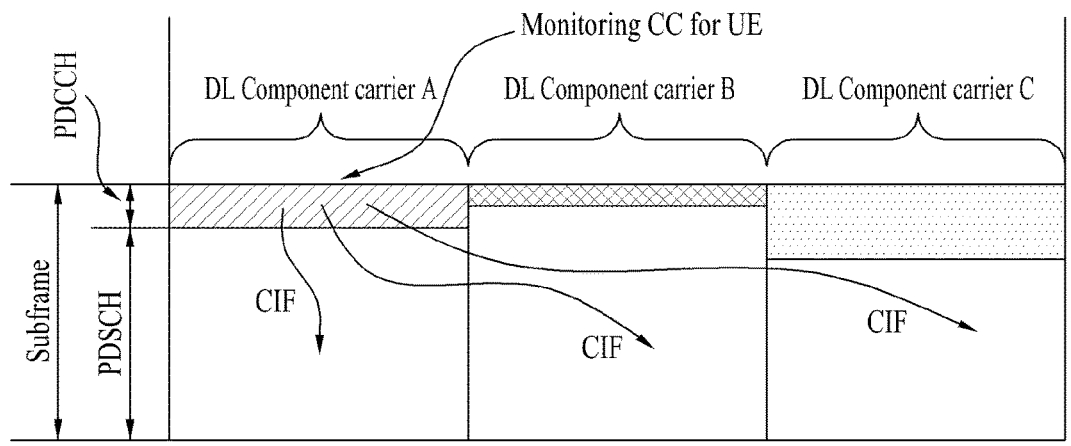
FIG. 9 illustrates cross-carrier scheduling.

FIG. 9 illustrates scheduling when plural carriers aggregated. It is assumed that three DL CCs are aggregated and DL CC A is set to a PDCCH CC. DL CC A, B and C may be referred to as serving CCs, serving carriers, serving cells, etc. When the CIF is disabled, each DL CC can transmit only a PDCCH that schedules a PDSCH corresponding to the DL CC without a CIF according to LTE PDCCH rule (non-cross-CC scheduling). When the CIF is enabled through UE-specific (or UE-group-specific or cell-specific) higher layer signaling, a specific CC (e.g. DL CC A) can transmit not only the PDCCH that schedules a PDSCH of DL CC A but also PDSCHs of other CCs using the CIF (cross-CC scheduling). A PDCCH is not transmitted on DL CC B and DL CC C.

In case of cross-CC scheduling, a DL/UL grant PDCCH for scheduling of DL/UL data transmitted/received on a specific CC (i.e. SCC) and ACK/NACK information for UL data can be transmitted/received only through a specific CC. The specific CC (or cell) is referred to as a scheduling CC (or cell) or monitoring CC (MCC) (or cell). A CC (or cell)

of which PDSCH/PUSCH is scheduled by a PDCCH of another CC is referred to as a scheduled CC (or cell). One or more MCCs can be configured for one UE. The MCC includes a PCC and a scheduling CC may be equivalent to the PCC when only one scheduling CC is present. In the specification, an MCC (e.g. PCC) and an SCC is in cross-CC scheduling relation. One or more SCCs can be set such that the SCCs and a specific MCC are in cross-CC scheduling relation.

When cross-CC scheduling is set, CCs on which signals are transmitted are defined according to signal type as follows.
PDCCH (UL/DL grant): MCC
PDSCH/PUSCH: CC indicated by a CIF of a PDCCH detected from an MCC
DL ACK/NACK (PHICH): MCC
CRC of UL/DL grant PDCCH can be masked with C-RNTI.

Embodiment: UL Synchronization Acquisition in CA-Based System

When a UE aggregates plural CCs, LTE-A considers application of a TA value applicable to a specific CC (e.g. PCC or PCell) to the plural CCs. However, there is a possibility that the UE aggregates plural CCs belonging to different frequency bands (i.e. CCs considerably spaced apart in the frequency domain) or plural CCs having different propagation characteristics. In the case of a specific CC, deployment of devices such as remote radio headers (RRHs) (i.e. repeaters) in a cell to extend coverage or remove a coverage hole may be considered. In this case, if UL transmission is performed using the method of commonly applying one TA value to plural CCs, then synchronization of UL signals transmitted on the plural CCs may be remarkably affected.

Figure 10:
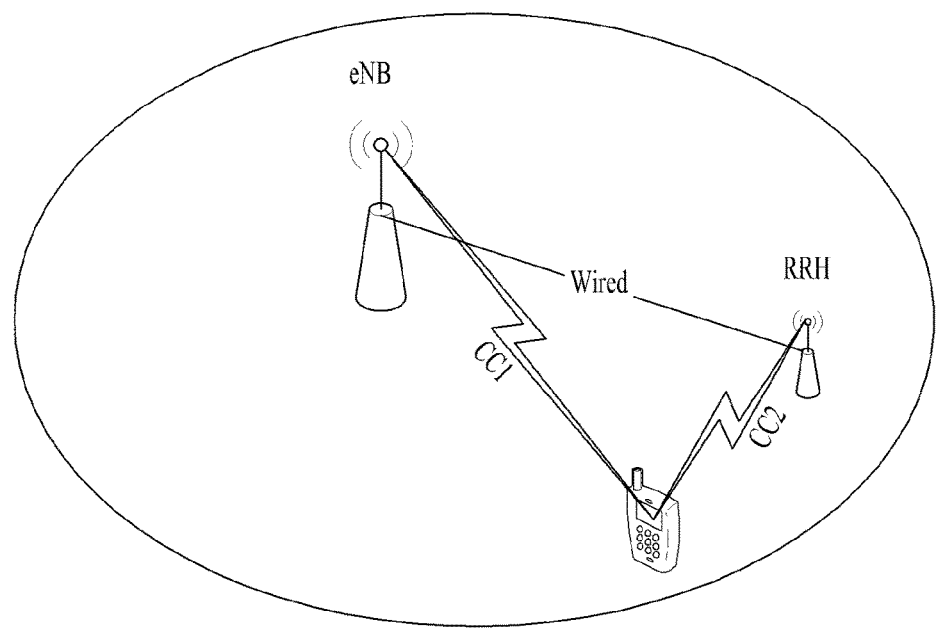
FIG. 10 illustrates aggregation of plural CCs having different UL synchronizations.

FIG. 10 illustrates a case in which plural CCs having different UL synchronizations are aggregated. In FIG. 10, a UE aggregates two CCs CC1 and CC2, CC1 performs transmission and reception using an RRH due to limited coverage and CC2 directly communicates with an eNB without RRH. In this case, propagation delay (or reception timing at the eNB) of a UL signal transmitted through CC1 from the UE and propagation delay (or reception timing at the eNB) of a UL signal transmitted through CC2 from the UE may differ from each other due to the position of the UE and frequency characteristics. When plural CCs have different propagation delay characteristics, it may be desirable to apply plural TA values for the CCs.

Figure 11:
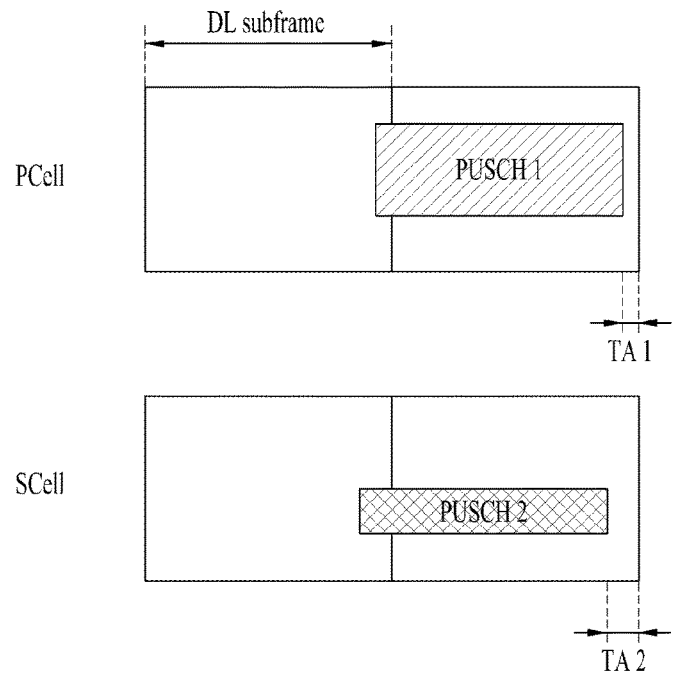
FIG. 11 illustrates transmission of a UL signal using a plurality of TAs.

FIG. 11 illustrates a case in which a UE aggregates two CCs (e.g. a PCell (PCC) and an SCell (SCC)) and different TA values are applied to the cells to transmit UL signals. As shown in FIG. 11, TA 1 can be applied to UL transmission of the PCell and TA 2 can be applied to UL transmission of the SCell. FIG. 11 shows a case in which transmission end timing of a UL subframe/signal (e.g. PUSCH, PUCCH, SRS, etc.) is advanced by TA from DL subframe reception end timing. Equivalently, transmission start timing of a UL subframe/signal (e.g. PUSCH, PUCCH, SRS, etc.) can be advanced by TA from DL subframe reception start timing.

Accordingly, independent allocation of TA per CC group (referred to as a TA group hereinafter) can be considered. Here, the TA group (TAG) may include one or more CCs. A single TA can be commonly applied to CCs in a TAG. In the case of a TAG (referred to as TAG_PCC hereinafter) to which a PCC (PCell) belongs, a TA determined based on the PCC or adjusted through a random access procedure with respect to the PCC can be applied to all CCs in TAG_PCC. In the case of a TAG (referred to as TAG_SCC) including SCCs (SCells) only, a TA determined based on a specific SCC in TAG_SCC may be applied to all CCs in TAG_SCC. To achieve this, it may be necessary to perform a random access procedure through an SCC. A non-contention-based random access procedure triggered using a PDCCH (PDCCH order) used for an eNB to order RACH preamble transmission, rather than a contention-based random access procedure triggered by a UE, may be suitable as the random access procedure with respect to the SCC.

Terms related to the non-contention-based random access procedure using the PDCCH order are defined as follows.
1) Msg0 (message 0): PDCCH order which orders RACH preamble transmission (BS=>UE)
2) Msg1 (message 1): RACH preamble corresponding to PDCCH order (UE=>BS)
3) Msg2 (message 2): PDSCH (referred to as RAR PDSCH) including a random access response (BS=>UE). The random access response includes a UL grant, TA, etc.
   Msg2-PDCCH: DL grant PDCCH corresponding to the RAR PDSCH (BS=>UE)
4) Msg3 (message 3): PUSCH based on a UL grant in the RAR PDSCH (UE=>BS)

As described above, only a single TA group to which a PCC belongs is present in LTE-A. Accordingly, a TA value, which is determined based on the PCC or adjusted through a random access procedure with respect to the PCC, is commonly applied to all CCs configured for the UE for UL synchronization. The UE cannot set a TA value until a TA value is received through the random access procedure (i.e. Msg2 reception). Accordingly, transmission start timing of Msg1 (on the PCC) is defined to correspond to reception start/end timing of a DL subframe (on the PCC) (i.e. the TA value is assumed to be 0). Therefore, the TA value adjusted based on Msg1 signal (TA value=0) can be interpreted as a value equal to a difference between reception start timing of a DL subframe and transmission start timing of a UL subframe (the DL subframe and the UL subframe having the same subframe number in the case of FDD) or a difference between reception end timing of a DL subframe and transmission start timing of a UL subframe (the DL subframe and the UL subframe respectively having subframe numbers of k and k+1 in the case of TDD). Here, the DL subframe reception start/end timing refers to reception timing (time) of the corresponding DL subframe start point/end point. Similarly, the UL subframe transmission start/end timing refers to transmission timing (time) of the corresponding UL subframe start point/end point.

In the case of a TAG (i.e. TAG_SCC) composed of SCCs only in a next generation system, a (non-contention-based) random access procedure (SCC-RACH) (using PDCCH order) can be performed through a specific SCC (referred to as RA-SCC) in TAG_SCC for UL synchronization. A TA value adjusted/determined based on SCC-RACH can be commonly applied to all CCs in TAG_SCC. The UE cannot set a TA value for TAG_SCC to which RA-SCC belongs until a TA value is received through SCC-RACH. In this case, when the conventional method is applied to determine SCC-RACH MSG1 transmission timing, Msg1 transmission start timing on RA-SCC can be set to correspond to DL subframe reception start/end timing on RA-SCC. That is, when the conventional method is applied, the TA value adjusted through SCC-RACH can be interpreted as a value equal to a difference between DL subframe reception start/end timing and UL subframe transmission start timing in the UE for TAG_SCC to which RA-SCC belongs.

When plural CCs are configured for a single UE, different UL channels/signals (e.g. a PUSCH and a PUCCH, a PUSCH and an SRS or a PUCCH and an SRS) may need to be simultaneously transmitted on the plural CCs. Since a single TA value is commonly applied to all CCs (that is, only one TAG is present) in the conventional system, the same UL transmission timing is applied to all CCs. Accordingly, when different UL channels/signals are simultaneously transmitted on a plurality of CCs, there is no misalignment between the eNB and the UE for UL transmission timing of the UL channels/signals and thus signal drop and power control according to UL channel/signal protection priority can be applied. However, when plural TAGs are allocated to a single UE, different UL channels/signals may collide in different symbol positions in the same subframe rather than in the same (SC-FDM or OFDM) symbol position in the same subframe, or in different symbol positions in neighboring subframes due to different UL transmission timings for the TAGs. In this case, the eNB cannot correctly know a UL transmission timing difference between TAGs although the UE can be aware of the UL transmission timing difference, resulting in UL transmission timing misalignment between the UE and the eNB. This may cause misalignment between the eNB and the UE in application of signal drop and power control according to UL channel/signal protection priority when plural UL transmissions collide, affecting/deteriorating not only the corresponding UE but also other UEs and the system.

Figure 12:
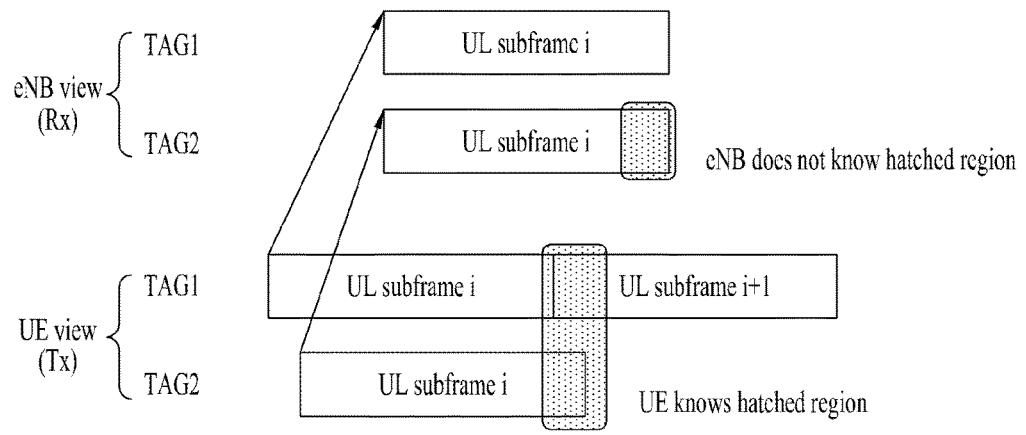
FIG. 12 illustrates a problem when misalignment between a base station (BS) and user equipment (UE) occurs for UL transmission timing when a plurality of TAGs is set.

FIG. 12 illustrates a problem when misalignment between the eNB and the UE occurs when plural TAGs are set. While FIG. 12 illustrates two TAGs (i.e. TAG1 and TAG2) for convenience, three or more TAGs can be present. It is assumed that transmission of a UL subframe of TAG2 is advanced by TA2 on the basis of a DL subframe of TAG2. That is, TA2=(Tx_UL_TAG2−Rx_DL_TAG2). Here, Tx_UL_TAG2 denotes the transmission start point of the UL subframe of TAG2 and Rx_DL_TAG2 denotes the reception end point of the DL subframe of TAG2. Similarly, it is assumed that transmission of a UL subframe of TAG1 is advanced by TA1 on the basis of a DL subframe of TAG1. That is, TA1=(TxUL_TAG1−Rx_DL_TAG1). Here, TxUL_TAG1 denotes the transmission start point of the UL subframe of TAG1 and Rx_DL_TAG1 denotes the reception end point of the DL subframe of TAG1.

Referring to FIG. 12, since TA values of TAG1 and TAG2 differ from each other, the UL subframe of TAG1 and the UL subframe of TAG2 do not correspond to each other when the UE performs UL transmission. FIG. 12 illustrates a case in which TAG1 UL subframe #(i+1) and TAG2 UL subframe #i overlap (hatched portion) at the symbol level. In this case, the UE can be correctly aware of a UL transmission timing difference between TAG1 and TAG2. Accordingly, the UE can correctly recognize overlap of a signal of TAG1 UL subframe #(i+1) and a signal of TAG2 UL subframe #i and overlap degree and perform operation according to the recognition result (for example, drop one of the signals according to priority). In the eNB, TAG1 UL subframe reception timing and TAG2 UL subframe reception timing correctly correspond to each other. Accordingly, the eNB cannot be aware of a UL transmission timing difference, which is generated when the UE performs UL transmission, through the UL signal reception state alone. The eNB can indirectly infer the UL transmission timing difference using a TA allocated per TAG. However, since the TA allocated per TAG is a relative value determined on the basis of DL reception timing of the corresponding TAG, the TA cannot provide correct information about the UL transmission timing difference between TAGs.

Referring to the following equation, a TA difference between TAGs includes information about a downlink reception timing difference. Accordingly, the eNB cannot recognize the correct UL transmission timing difference.

difference (TA2−TA1)=difference [(TxUL_TAG2−Tx_UL_TAG1)−(Rx_DL_TAG2−Rx_DL_TAG1)]

For the aforementioned reason, the eNB cannot be aware of the UL transmission timing difference between TAGs upon simultaneously receiving UL signals with different TAGs, and thus cannot recognize whether the UL signals overlap and overlap range (hatched region). Accordingly, an error may be generated when the eNB performs signal processing (e.g. decoding) in the hatched region.

To solve the aforementioned problem, the present invention provides a method for setting RACH preamble transmission start timing on an arbitrary CC (referred to as TAG1 random access component carrier, TAG1-RACC hereinafter) belonging to an arbitrary TAG (referred to as TAG1 hereinafter) to correspond to reference timing (e.g. subframe start/end timing (+offset)) of a specific CC (referred to as TAG2 reference component carrier, TAG2-RefCC hereinafter) belonging to a TAG (referred to as TAG2 hereinafter) differently from TAG1 in a random access procedure. Specifically, subframe start/end timing of TAG2-RefCC, which is reference timing for Msg1 transmission start timing on TAG1-RACC, can be set as follows.

Opt 1) UL subframe transmission start timing on TAG2-RefCC

Opt 2) DL subframe reception start timing on TAG2-RefCC (particularly, in FDD)

Opt 3) DL subframe reception end timing on TAG2-RefCC (particularly, in TDD)

Here, TAG1 may be a TAG (i.e. TAG_SCC) which is composed of SCCs only. TAG2 may be a TAG for which UL synchronization has been acquired (or TA has been adjusted). For example, TAG2 may be a TAG (i.e. TAG_PCC) to which a PCC belongs. TAG2-RefCC may be a PCC. Information (e.g. TAG2 and/or TAG2-RefCC identification information) about TAG2 (TAG2-RefCC) may be additionally signaled.

When Opt 2 is exemplified, TA (referred to as TAG1_TA hereinafter) of TAG1 and TA (referred to as TAG2_TA hereinafter) of TAG2 can be given as follows.

TAG1_TA=(Tx_UL_TAG1-RACC−Rx_DL_TAG2-RefCC)

TAG2_TA=(Tx_UL_TAG2-RefCC−Rx_DL_TAG2-RefCC)

Here, Tx_UL_TAG1-RACC denotes UL subframe transmission start timing on TAG1 RACC, Tx_UL_TAG2-RefCC denotes UL subframe transmission start timing on TAG2 RefCC, and Rx_DL_TAG2-RefCC denotes DL subframe reception start timing on TAG2 RefCC.

The eNB knows TAG1_TA and TAG2_TA and difference (TAG2_TA−TAG1_TA)=difference (Tx_UL_TAG2-RefCC−Tx_UL_TAG1-RACC). Accordingly, the eNB can correctly infer a relative UL transmission start timing difference between TAG1 (TAG1-RACC) and TAG2 (TAG2-RefCC). For Opt 1 and Opt 3, the eNB can also correctly infer a relative UL transmission start timing difference between TAGs.

In the case of Opt 1, Opt 2 and Opt 3, timing obtained by applying a predetermined timing offset (i.e. initial TA value) to DL subframe reception start/end timing (or UL subframe transmission start timing) on TAG2-RefCC can be set as RACH preamble transmission start timing on TAG1-RACC.

The initial TA value may be 0 (in the case of FDD) or a specific value (in consideration of a DL/UL transmission/reception switching timing gap in the case of TDD).

Figure 13:
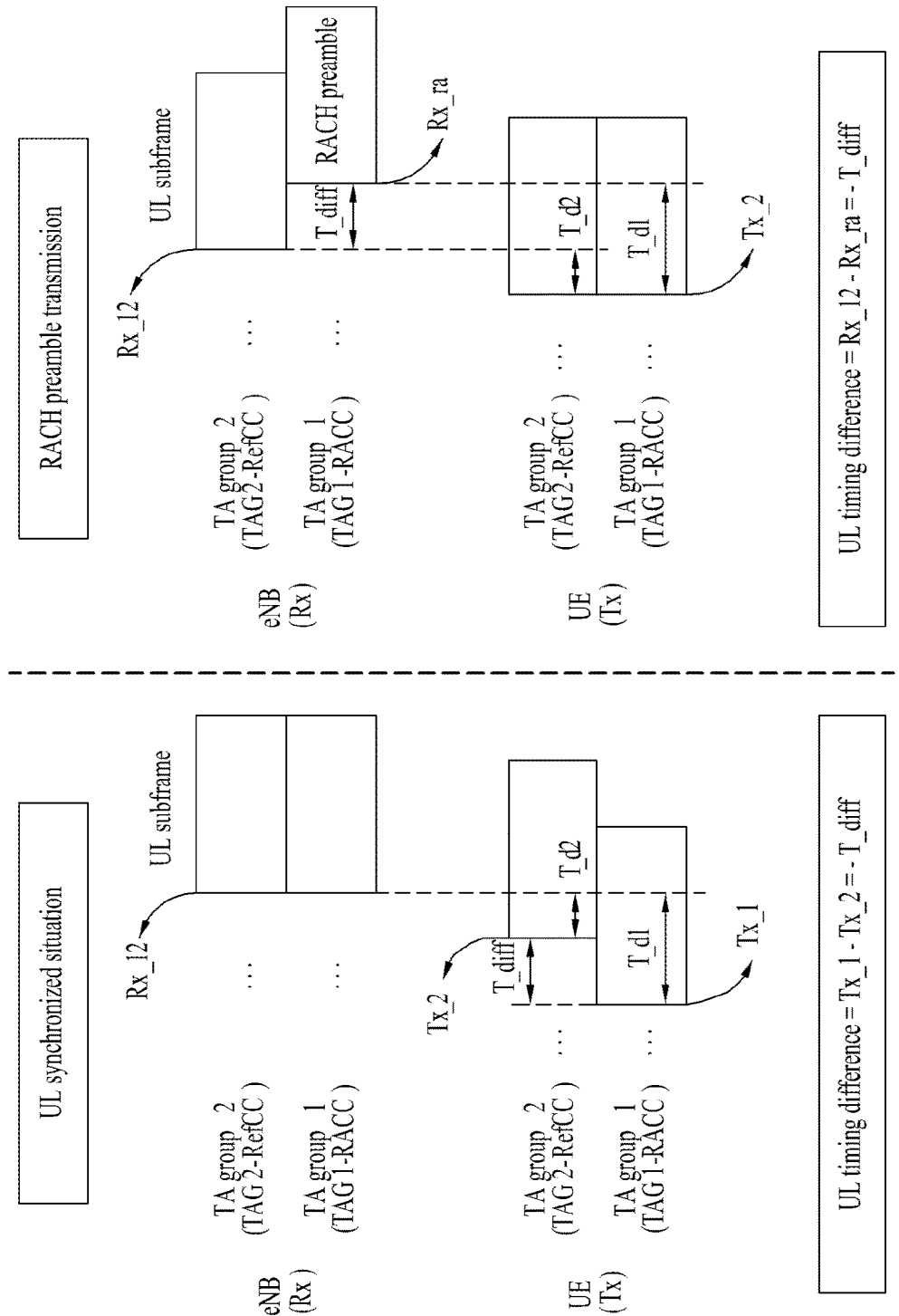
FIGS. 13 and 14 illustrate a method for acquiring UL synchronization according to an embodiment of the present invention.

FIG. 13 illustrates a method for acquiring UL synchronization according to an embodiment of the present invention. The left part shows a case in which perfect UL synchronization is acquired for TAG1 and TAG2 and the right part shows a case in which UL synchronization is acquired for TAG2 only. A description will be given of application of the method proposed by the present invention to a random access procedure for UL synchronization of TAG1 with reference to the right part of FIG. 13.

Time related parameters are defined as follows.

1) Tx_1: (UE) UL transmission timing (absolute timing) of TAG1 in UL synchronized state 2) Tx_2: (UE) UL transmission timing (absolute timing) of TAG2 in UL synchronized state 3) Rx_12: (eNB) UL reception timing (absolute timing) of TAG1 and TAG2 in UL synchronized state 4) T_d1: UL transmission/reception timing difference (between UE and eNB) in TAG1 (i.e. difference between Rx_12 and Tx_1)

5) T_d2: UL transmission/reception timing difference (between UE and eNB) in TAG2 (i.e. difference between Rx_12 and Tx_2)

6) T_diff: (UE) UL transmission timing difference between TAG1 and TAG2 (i.e. difference between Tx_1 and Tx_2)

7) Rx_ra: (eNB) RACH preamble reception timing (absolute timing) in TAG1 when the method proposed by the present invention is applied Referring to the left part of FIG. 13, UL transmission timing of TAG1 is ahead of UL transmission timing of TAG2 by T_diff. Referring to the right part of FIG. 13, RACH preamble transmission timing on TAG1 (TAG1-RACC) corresponds to UL transmission timing Tx_2 on TAG2 (TAG2-RefCC according to the proposed method. Accordingly, the RACH preamble is behind UL reception timing Rx_12 of (UL synchronized) TAG1 (TAG1-RACC) by T_diff (refer to Rx_ra) from the viewpoint of the eNB. Therefore, the eNB can correctly infer the UL transmission timing difference T_diff between TAG1 and TAG2 by calculating a difference between Rx_12 and Rx_ra.

Figure 14:
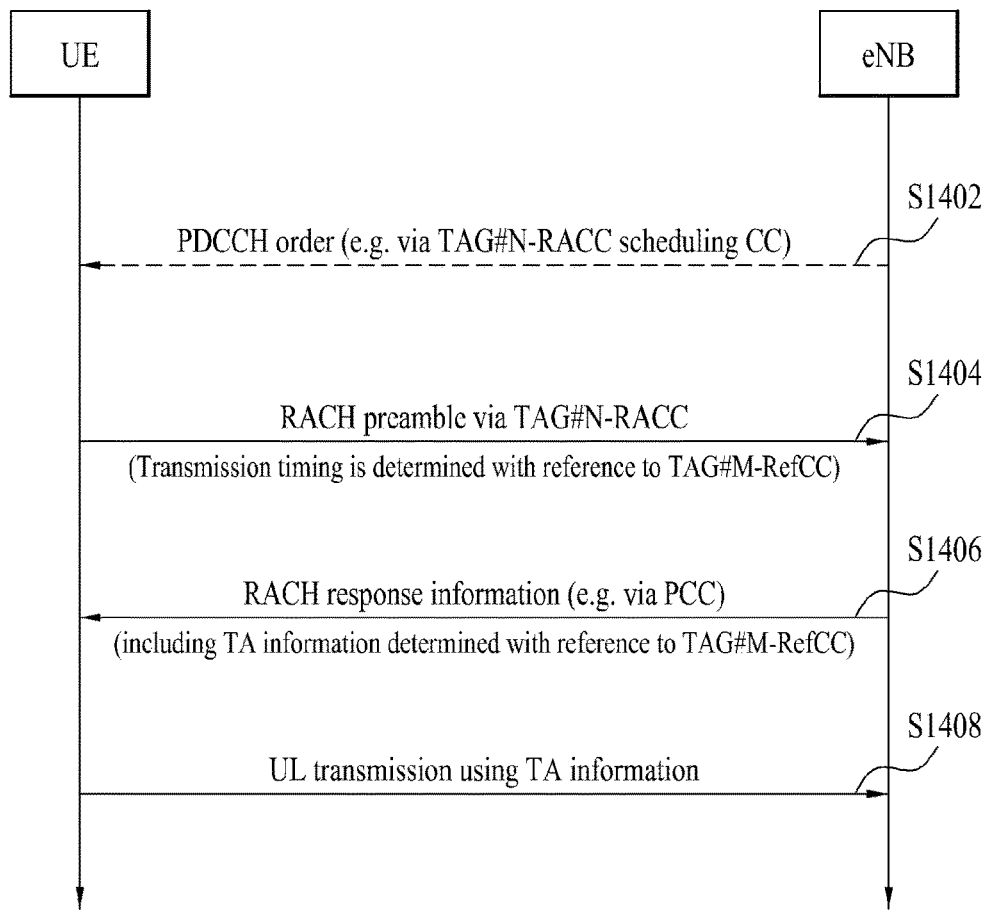

FIG. 14 illustrates a UL synchronization acquisition procedure according to an embodiment of the present invention. While FIG. 14 illustrates a case in which a random access procedure for acquiring UL synchronization is performed, the random access procedure can be replaced by an equivalent procedure (e.g. ranging process) according to system. The present embodiment can be applied for UL synchronization acquisition of TAG_SCC.

Referring to FIG. 14, a UE may receive PDCCH order which instructs the random access procedure to be initiated from an eNB (S1402) for UL synchronization of TAG#N. The PDCCH order can be received through a CC that schedules a specific CC (referred to as RACC hereinafter) in TAG#N. The PDCCH order can be received through an MCC with respect to the RACC in the case of cross-CC scheduling and received through the RACC in the case of non-cross-CC scheduling. Here, TAG#N is TAG_SCC and the RCC may be a specific SCC. Upon initiation of the random access procedure, the UE transmits an RACH preamble through the RACC (referred to as TAG#N-RACC) in TAG#N (S1404). RACH preamble transmission timing is determined based on a specific CC (Referred to as TAG#M-RefCC hereinafter) of TAG#M. For example, RACH preamble transmission timing on TAG#N-RACC can be determined based on TAG#M-RefCC according to Opt 1 to 3. Then, the UE receives RACH response information (PDSCH) from the eNB (S1406). The RACH response information (PDSCH) includes TA information. Here, the TA information can be determined based on TAG#M-RefCC. The RACH response information (PDSCH) can be received through a PCC. A PDCCH that schedules the RACH response information (PDSCH) includes an RA-RNTI and can be received through a CSS of the PCC (not shown). The TA information received in step S1406 is applied to all CCs in TAG#N (S1410). For example, the UE can advance UL subframe transmission timing of TAG#N by TA from DL subframe reception start/end timing of TAG#M (or UL subframe transmission start timing of TAG#M).

Figure 15:
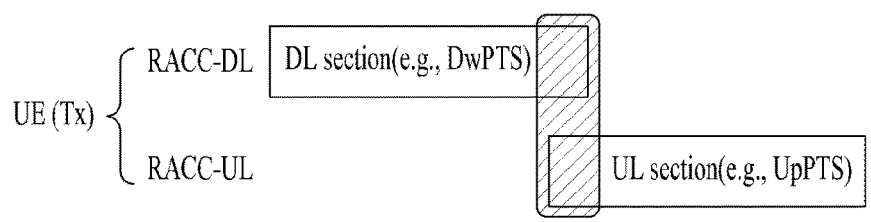
FIG. 15 illustrates a case in which a DL period and a UL period of the same CC overlap when the proposed method is applied in a TDD system.

FIG. 15 illustrates a case in which a DL region and a UL region of the same CC overlap in a TDD system when the proposed method is applied. According to the proposed method, RACH preamble transmission timing on TAG1-RACC can be determined on the basis of DL subframe reception start/end timing on TAG2-RefCC. In this case, RACH preamble transmission timing (in a specific subframe (e.g. UpPTS of a special subframe)) of TAG1-RACC can be ahead of a reception end point of the DL period (in the specific subframe (e.g. DwPTS of the special subframe)) of TAG1-RACC, as shown in FIG. 15. That is, RACH preamble transmission timing of TAG1-RACC and DL reception interval (i.e. overlapped DL region) of TAG1-RACC can overlap.

In TDD, a UE operating in a half-duplex mode due to hardware configuration or for other reasons/purposes can be considered. Since simultaneous transmission and reception operations are not permitted in the half-duplex mode, the following methods can be considered for half-duplex operation in the case of FIG. 15.

Sol 1) Use of an overlapped DL region is limited. That is, the UE can abandon reception for the DL region.

Sol 2) PDSCH/EPDCCH (Enhanced PDCCH)/PMCH (Physical Multicast Channel)/PRS (Positioning Reference Signal) scheduling/transmission and DL signal/channel (e.g. pathloss, CSI (Channel State Information), RSRP (Reference Signal Receiver Power), RSRQ (Reference Signal Received Quality), etc.) measurement/estimation can be limited in the overlapped DL region. That is, the UE can omit DL signal/channel measurement/estimation (reporting with respect to the measurement/estimation) in the corresponding DL region on the assumption that PDSCH/EPDCCH/PMCH/PRS are not scheduled/transmitted in the DL region.

Sol 3) Use of some last symbols (referred to as use-restricted symbols) of the overlapped DL region can be limited such that RACH preamble transmission timing and the DL region do not overlap. That is, the UE can perform reception operation (e.g. PDSCH/EPDCCH/PMCH/PRS scheduling/transmission and DL signal/channel measurement/estimation) in a DL region other than the region corresponding to the use-restricted symbols. Here, information about the use-restricted symbol region (or DL region other than the symbol region) can be predetermined, signaled by the eNB or reported by the UE.

The method of setting Msg1 transmission start timing on TAG1-RACC on the basis of specific timing (e.g. subframe start/end timing (e.g. Opt 1, 2 or 3)) of TAG2-RefCC can be applied as follows.

1) The method is applied per random access procedure performed through TAG1-RACC.

2) The method is applied only to the initial random access procedure (or all random access procedures except for the initial random access procedure) after allocation of TAG1 (RAG1-RACC) through RRC.

3) Whether the method is applied is semi-statically set through additional RRC signaling.

4) Whether the method is applied is set through CC activation command or additional MAC (Medium Access Control) signaling.

5) Whether the method is applied is set using a field in the PDCCH order that orders RACH preamble transmission.

1) illustrates a case in which the method proposed by the present invention is applied all the time and 2) to 5) illustrate a case in which the proposed method is applied conditionally. For convenience, cases 2) to 5) in which the method proposed by the present invention is applied are referred to as condition A.

Accordingly, the method proposed by the present invention is not applied to random access procedures other than the aforementioned cases or a case in which the proposed method is not applied (referred to as condition B for convenience). That is, in the case of condition B, RACC RACH preamble transmission timing can be determined on DL subframe reception start/end timing of RACC (Opt 4) similarly to the conventional method. Opt 4 may be useful when it is necessary to perform independent UL timing tracking per TAG since TAGs have different propagation delay characteristics. In addition, Opt 4 may be useful when TAG1-RACC Msg1 transmitted in accordance with the subframe start/end timing of TAG2-RefCC is prevented from being received from a previous subframe (from the viewpoint of the eNB) when propagation delay with respect to TAG2 (TAG2-RefCC) is considerably larger than that of TAG1 (TAG1-RACC).

Figure 16:
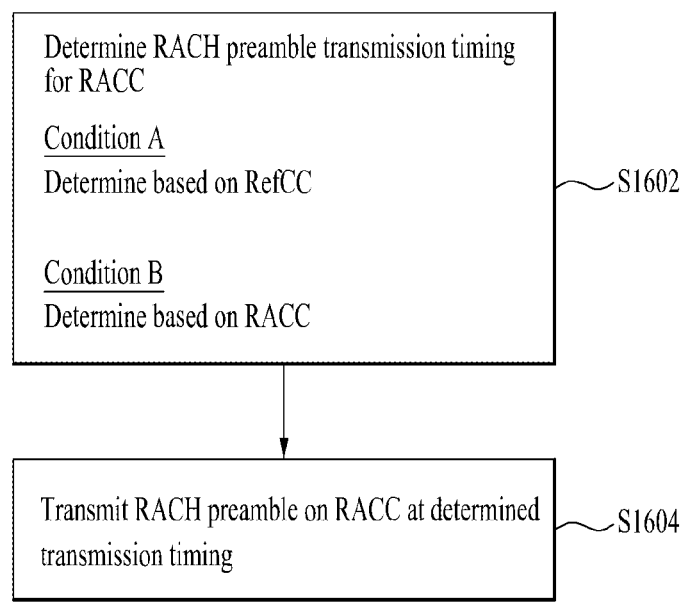
FIG. 16 illustrates a method for determining RACH preamble transmission timing according to an embodiment of the present invention.

FIG. 16 illustrates a method for determining RACH preamble transmission timing according to an embodiment of the present invention. It is assumed that an RACH preamble is transmitted through an RACC in the present embodiment. The RACC may be a CC in TAG_SCC.

Referring to FIG. 16, a UE may determine RACH preamble transmission timing upon initiation of a random access procedure (S1602). Here, reference timing used to determine the RACH preamble transmission timing may be set according to condition/configuration. Specifically, in the case of condition B, transmission timing of the RACH preamble for the RACC can be determined based on specific timing (e.g. RACC subframe start/end timing) in the RACC (Opt 4). In the case of condition A, transmission timing of the RACH preamble for the RACC can be determined based on specific timing (e.g. RefCC subframe start/end timing (e.g. Opt 1, 2 or 3)) of RefCC. Here, RefCC may be a CC belonging to a TAG different from the TAG to which the RACC belongs. For example, RefCC can be a CC (e.g. PCC) included in TAG_PCC. The UE may transmit the RACH preamble on the RACC based on the transmission timing determined in step S1602 (S1604).

The method proposed by the present invention can be equally applied to RACH preamble transmission start timing in a contention-based SCC random access procedure triggered by the UE through RACH preamble transmission on an SCC without additional instruction (according to PDCCH order) from the eNB. In addition, the relationship between a CC on which Msg1 is transmitted and a CC that is the basis of determination of transmission timing of Msg1 can be set by applying the present invention to two arbitrary CCs (which belong to different TAGs or the same TAG) irrespective of TAG.

Figure 17:
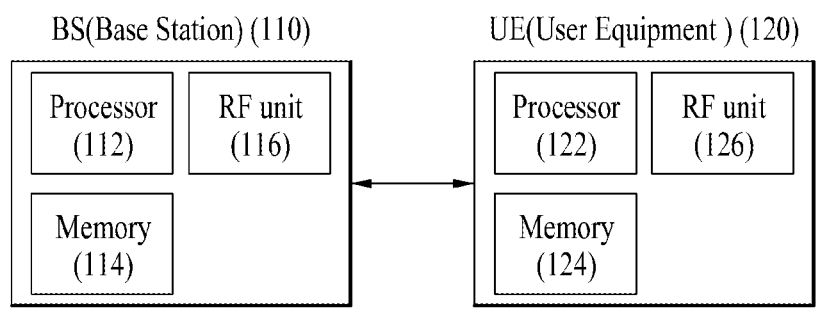
FIG. 17 illustrates a BS and a UE to which the present invention is applicable.

FIG. 17 illustrates a BS and a UE to which the present invention is applicable.

Referring to FIG. 17, a wireless communication system includes a BS 110 and a UE 120. When the wireless communication system includes a relay, the BS or UE can be replaced by the relay.

The BS 110 may include a processor 112, a memory 114 and a radio frequency (RF) unit 116. The processor 112 may be configured to implement procedures and/or methods proposed by the present invention. The memory 114 may be connected to the processor 112 and store information related to operations of the processor 112. The RF unit 116 may be connected to the processor 112 and transmit and/or receive RF signals. The UE 120 may include a processor 122, a memory 124 and an RF unit 126. The processor 122 may be configured to implement procedures and/or methods proposed by the present invention. The memory 124 may be connected to the processor 122 and store information related to operations of the processor 122. The RF unit 126 may be connected to the processor 122 and transmit and/or receive RF signals.

The embodiments of the present invention described hereinbelow are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present invention or included as a new claim by subsequent amendment after the application is filed.

A specific operation described as performed by the BS may be performed by an upper node of the BS. Namely, it is apparent that, in a network comprised of a plurality of network nodes including a BS, various operations performed for communication with a UE may be performed by the BS, or network nodes other than the BS. The term BS may be replaced with the term, fixed station, Node B, eNode B (eNB), access point, etc. The term terminal may be replaced with the terms UE, MS, Mobile Subscriber Station (MSS), etc.

The embodiments of the present invention may be achieved by various means, for example, hardware, firmware, software, or a combination thereof. In a hardware configuration, an embodiment of the present invention may be achieved by one or more ASICs (application specific integrated circuits), DSPs (digital signal processors), DSPDs (digital signal processing devices), PLDs (programmable logic devices), FPGAs (field programmable gate arrays), processors, controllers, microcontrollers, microprocessors, etc.

In a firmware or software configuration, an embodiment of the present invention may be implemented in the form of a module, a procedure, a function, etc. Software code may be stored in a memory unit and executed by a processor. The memory unit is located at the interior or exterior of the processor and may transmit and receive data to and from the processor via various known means.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

INDUSTRIAL APPLICABILITY

The present invention can be used for a UE, an eNB and other apparatuses of a wireless mobile communication system.

The invention claimed is:

1. A method for acquiring uplink synchronization in a user equipment (UE) for which a plurality of cells are configured in a carrier aggregation-based wireless communication system, the method comprising:
receiving, by the UE, configuration information indicating whether the UE is to use a second cell belonging to a second timing advance group (TAG) as an uplink timing reference cell for a first cell belonging to a first TAG different from the second TAG;
transmitting, by the UE, a random access preamble at a transmission start time on the first cell based on a physical downlink control channel (PDCCH) order allocating the random access preamble to the UE;
receiving a random access response message (RAR), including an uplink timing adjustment value for the first cell, in response to the random access preamble transmitted on the first cell; and
performing an uplink transmission, other than the transmission of the random access preamble, on the first cell using the uplink timing adjustment value after receiving the RAR,
wherein the transmission start time of the random access preamble on the first cell is determined based on specific timing related to the second cell when the configuration information indicates that the UE is to use the second cell as an uplink timing reference cell for the first cell, and
wherein the transmission start time of the random access preamble on the first cell is determined based on a reception time related to a downlink subframe of the first cell when the configuration information indicates that the UE is not to use the second cell as the uplink timing reference cell for the first cell.

2. The method according to claim 1, wherein the first cell is a secondary cell (SCell) and the second cell is a primary cell (PCell).

3. The method according to claim 1, wherein the specific timing related to the second cell is a transmission start time of an uplink subframe in the second cell.

4. The method according to claim 1, wherein the specific timing related to the second cell is a reception start time of a downlink subframe in the second cell.

5. The method according to claim 1, wherein the specific timing related to the second cell is a reception end time of a downlink subframe in the second cell.

6. The method according to claim 1, wherein the first TAG includes no primary cell (PCell).

7. The method according to claim 1, wherein, when the transmission start time of the random access preamble on the first cell and the downlink reception interval of the first cell overlap in a time region and when the UE operates in a half-duplex mode where simultaneous transmission and reception operations are not permitted, downlink signal reception is omitted in the overlapped time region.

8. The method according to claim 1, wherein the configuration information is received through the PDCCH order, a radio resource control (RRC) signal or a medium access control (MAC) signal.

9. The method according to claim 1, wherein the transmission start time of the random access preamble on the first cell is before the UE receives any uplink timing adjustment value for the first cell.

10. A User Equipment (UE) for use in a carrier aggregation-based wireless communication system, comprising:
a radio frequency (RF) unit; and
a processor that:
controls the RF unit to receive configuration information indicating whether the UE is to use a second cell belonging to a second timing advance group (TAG) as an uplink timing reference cell for a first cell belonging to a first TAG different from the second TAG,
controls the RF unit to transmit a random access preamble at a transmission start time on the first cell based on a physical downlink control channel (PDCCH) order allocating the random access preamble to the UE,
controls the RF unit to receive a random access response message (RAR), including an uplink timing adjustment value for the first cell, in response to the random access preamble transmitted on the first cell; and
controls the RF unit to perform an uplink transmission, other than the transmission of the random access preamble, on the first cell by using the uplink timing adjustment value after receiving the RAR,
wherein the transmission start time the random access preamble on the first cell is determined based on specific timing related to the second cell when the configuration information indicates that the UE is to use the second cell as an uplink timing reference cell for the first cell, and
wherein the transmission start time of the random access preamble on the first cell is determined based on a reception time related to a downlink subframe of the first cell when the configuration information indicates that the UE is not to use the second cell as the uplink timing reference cell for the first cell.

11. The UE according to claim 10, wherein the first cell is a secondary cell (SCell) and the second cell is a primary cell (PCell).

12. The UE according to claim 10, wherein the specific timing related to the second cell is a transmission start time of an uplink subframe in the second cell.

13. The UE according to claim 10, wherein the specific timing related to the second cell is a reception start time of a downlink subframe in the second cell.

14. The UE according to claim 10, wherein the specific timing related to the second cell is a reception end time of a downlink subframe in the second cell.

15. The UE according to claim 10, wherein the first TAG includes no primary cell (PCell).

16. The UE according to claim 10, wherein, when the transmission start time of the random access preamble on the first cell and the downlink reception interval of the first cell overlap in a time region and when the UE operates in a half-duplex mode where simultaneous transmission and reception operations are not permitted, a downlink signal reception is omitted in the overlapped time region.

17. The UE according to claim 10, wherein the configuration information is received through the PDCCH order, a radio resource control (RRC) signal or a medium access control (MAC) signal.

18. The UE according to claim 10, wherein the transmission start time of the random access preamble on the first cell is before the UE receives any uplink timing adjustment value for the first cell.

* * * * *